Sept. 11, 1928.

E. M. HEWLETT ET AL 1,684,132

MEANS FOR REPRODUCING POSITION

Filed Nov. 30, 1925 2 Sheets-Sheet 1

Inventors:
Edward M. Hewlett;
Waldo W. Willard;
by
Their Attorney.

Sept. 11, 1928.  
E. M. HEWLETT ET AL  
1,684,132  
MEANS FOR REPRODUCING POSITION  
Filed Nov. 30, 1925  
2 Sheets-Sheet 2

Inventors:  
Edward M. Hewlett;  
Waldo W. Willard;  
by *Alexander S. Lune*  
Their Attorney.

Patented Sept. 11, 1928.

1,684,132

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

MEANS FOR REPRODUCING POSITION.

Application filed November 30, 1925. Serial No. 72,201.

Our invention relates to means for reproducing position, and has for its object the provision of means whereby a moving object may be brought to rest in a predetermined position.

More specifically, our invention relates to systems for reproducing position in which the motion of a controlling object is utilized through suitable mechanism to control a motor so as to cause the motor to drive a second or driven object into positional agreement or correspondence with the first. Such a system is described and claimed, for example, in our Patent No. 1,547,392, dated July 28, 1925. There is a tendency in such systems for the driving motor to overrun after its circuit has been broken by reason of its own inertia and the inertia of the other moving parts associated with it and thereby move the driven object too far. This overrunning would cause the driving motor to be energized in the opposite direction and thereby reversed, in which case it would overrun in the opposite direction and thus oscillate from one side to the other of its final position before coming to rest, whereby an appreciable time interval would be introduced. In one of its aspects our invention relates to means whereby the final position of the driven object is anticipated in such manner that the driven object is brought to rest in positional agreement with the controlling object without overrunning so that this oscillation period is eliminated and the driven object therefore brought to rest promptly.

In carrying out our invention in one form we provide means responsive to the speed of the driven object for affecting the motor control mechanism so as to anticipate the final position of the controlled object.

Figure 1:
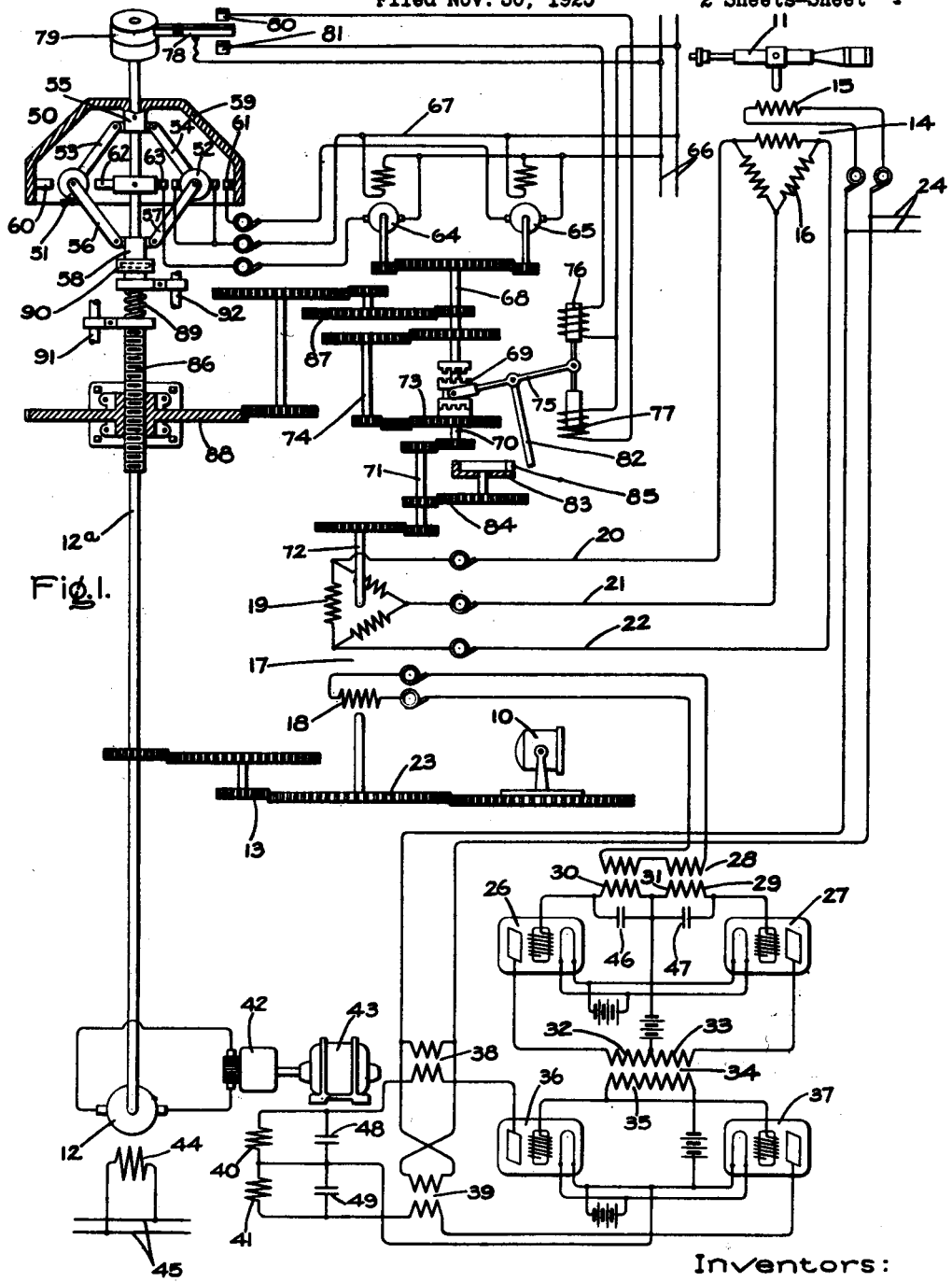
Figure 2:
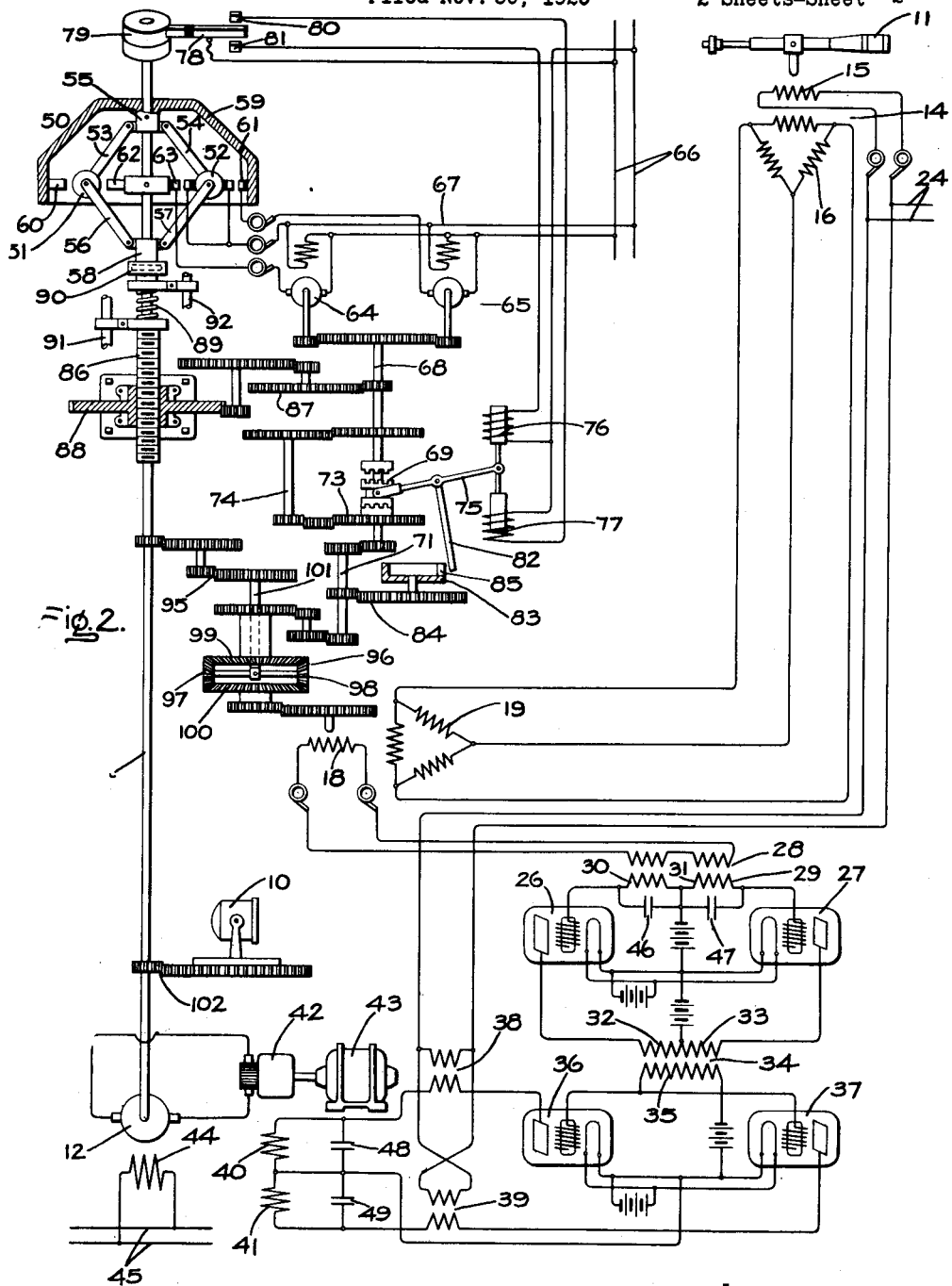

For a more complete understanding of our invention reference should be had to the accompanying drawings in which Fig. 1 shows in diagrammatic form a system for reproducing position embodying our invention; while Fig. 2 is a diagrammatic representation of a modified form of our invention.

Referring to the drawing, we have shown our invention in one form as applied to the control of a searchlight 10, constituting a driven object, in accordance with the movements of a remotely located telescope 11, constituting a controlling object, the searchlight being controlled in such manner that it is caused to follow the movements of the telescope and thereby be directed on the same object as the telescope. As shown, the searchlight is driven in train, i. e., in a plane which is normally horizontal, so as to follow the movements of the telescope in a plane which is the same or parallel to the train plane of the searchlight. The searchlight is operated by suitable driving means, such as a direct current electric motor 12, which is connected through a suitable gear train 13 to drive the searchlight in train. A gear train 13 having a suitable driving ratio will be used. Preferably this driving ratio will be such that the motor 12 will operate at many times the speed of the searchlight. The circuit of the electric motor 12 is controlled in accordance with the movements of the telescope 11 so as to cause the motor to drive the searchlight.

Operatively connected to the telescope 11 is an inductive device 14 comprising in the form shown a field winding 15 which is rotatably mounted and driven by the telescope in train, and a stationary polycircuit armature winding 16 which may be physically similar to a 3-phase bi-polar distributed armature winding. A second inductive device 17 is provided, this device having a rotatably mounted field winding 18 and a polycircuit armature winding 19, these windings being similar respectively to windings 15 and 16 of the device 14. Similar points of the windings 16 and 19 are electrically connected together by means of conductors 20, 21 and 22. The field winding 18 is rotated with the searchlight by the electric motor 12 and is connected to the motor 12 by way of a gear 23 which forms a part of the gear train 13. As shown, the field windings 15 and 18 are operated in 1:1 speed ratios with the telescope and searchlight respectively. The field winding 15 is connected to a suitable alternating current supply circuit 24.

The inductive devices 14 and 17 are of a type often used for transmitting angular motion. In the present system, however, the inductive devices are used for producing an alternating electromotive force which has a value dependent on the angular disagreement of the telescope and searchlight, and which has a direction or polarity with respect to the alternating current supply source 24 which is determined by the direction of this disagreement. The field windings 15 and 18 are operatively connected to the telescope and searchlight respectively in such manner that when the searchlight is in angular agreement with the telescope, as shown in the drawing, the winding 18 is in a position with relation to the armature winding 19 which is at right angles to the position of the field winding 15 with respect to its armature winding 16. It will be seen that the field winding 15 induces electromotive forces in the circuits of the armature winding 16 which electromotive forces are impressed on the armature winding 19 and a magnetic field thereby produced by the armature winding 19 in the device 17, which field has an angular position and a direction with respect to winding 19 corresponding to the angular position and direction with respect to winding 16 of the field produced by the winding 15. When the telescope and searchlight are in angular agreement, the winding 18 stands at right angles to this field so that its turns are not interlinked by the field, and, therefore, no electromotive force is induced in it. When the telescope is rotated, the field of winding 15 is rotated therewith and hence the field produced by the armature winding 19 is rotated a like amount so that it interlinks the winding 18 and consequently induces an electromotive force in the winding 18. The magnitude of this electromotive force depends on the amount of movement given the telescope, and it will be observed has a direction with respect to the supply source 24 which is dependent upon the direction of movement applied to the telescope. This electromotive force is used to control the driving motor 12 in substantially the manner described and claimed in our Patent No. 1,547,392 dated July 28, 1925.

For the control of the motor 12 the electromotive force induced in the winding 18 upon angular disagreement of the telescope and the searchlight is impressed on the input or grid circuits of two electron discharge amplifying devices or tubes 26 and 27, shown as of the three electrode type. This connection is preferably effected through a transformer 28, the secondary 29 of which is provided with a central tap so that one-half 30 of the secondary is connected in the input or grid circuit of tube 26 while the other half 31 is connected in the input circuit of tube 27. The output or plate circuits of the tubes are connected to the two halves 32 and 33 of the primary of a transformer 34 having a secondary winding 35. The two tubes 26 and 27 are thus connected in a push-pull or two wave circuit so as to reproduce both halves of the electromotive force wave induced in winding 18 and thus impress an alternating voltage on transformer 34. The purpose of tubes 26 and 27 is to amplify the power output of the winding 18, the winding 18 being called upon to carry only the very slight load required to control the grids of the tubes.

This amplified output of winding 18 is impressed in turn on the grid or input circuits of two electron discharge devices or tubes 36 and 37, also shown of the three electrode type, the entire voltage of the secondary 35 of the transformer 34 being impressed on the grids of both tubes. The plate or output circuits of the tubes 36 and 37 are energized from the alternating current supply source 24 through suitable transformers 38 and 39, the connections of the transformers being such that their voltages are opposite in direction so that at any given instant the plates of the tubes 36 and 37 have opposite polarities. In the output circuits of the tubes 36 and 37 respectively are differential field windings 40 and 41 of a direct current generator 42 which is driven at a uniform speed by means of a suitable driving motor 43. This generator supplies power, with further amplification, to the armature of the electric driving motor 12. The field winding 44 of the motor 12 is connected to a suitable source of direct current supply 45. One purpose of the generator 42 is to introduce an additional amplification of power. Obviously if further amplification is desired a plurality of generators may be used, the output of the first energizing the field of the second, etc.

As thus connected, it will be observed that when the transformer 34 impresses a voltage on the grids of tubes 36 and 37 due to movement of the telescope, one or the other of the field windings 40 or 41 will be energized depending on the polarity of the output of transformer 34. For example, if the polarity of transformer 34 is such that the grid of tube 36 is positive at the same instant that its plate is positive, then a current will flow through the field winding 40, since it is in the output circuit of the tube 36, whereby the generator 42 will be caused to supply power at a given polarity to the motor 12, whereupon the motor will operate in a given direction and drive the searchlight in a direction to follow the telescope. When the searchlight reaches angular agreement with the telescope, resulting in zero voltage across the terminals of winding 18, and hence a zero voltage impressed by transformer 34, neither of the field windings 40 and 41 will be energized and consequently no power will be supplied to the motor 12. The motor 12 will then be short circuited through the armature of the generator 42 and will be brought to rest by dynamic braking. Upon movement of the telescope in the opposite direction, the transformer 34 will impress a voltage having the opposite direction, that is, displaced 180 degrees in phase, on tubes 36 and 37 whereby the grid of tube 27 will be positive at the same instant that its plate is positive, so that the field winding 41 will be excited causing the generator 42 to supply power with the opposite polarity to the motor 12. This causes the motor 12 to operate in the opposite direction until the searchlight is again brought into angular agreement with the telescope, when the motor will be stopped by dynamic braking, as will be understood from the previous description.

To improve the operation, condensers 46 and 47 are connected respectively across the two halves 30 and 31 of transformer secondary winding 29. Condensers 48 and 49 are connected across the field windings 40 and 41 respectively for the purpose of absorbing voltage surges.

In addition to the means for controlling the motor previously described, which is substantially as shown in our aforesaid patent, we have provided means for causing the motor 12 to come to rest quickly without overrunning. For this purpose the armature winding 19 is rotatably mounted and rotated under the control of a speed responsive device 50 which is driven by the motor 12. The speed responsive device is similar to a well known form of fly ball speed governor. It comprises two diametrically spaced balls 51 and 52 which are secured on the ends of arms 53 and 54 having their upper ends pivotally secured to a collar 55, this collar being rigidly secured to the driving shaft 12$^a$ of the driving motor 12. The balls are furthermore, connected through links 56 and 57 to a collar 58 slidably mounted on the shaft 12$^a$. It will be observed that changes in the speed of rotation of the shaft 12$^a$ cause the balls to move outward or inward in accordance with the centrifugal force acting upon them due to their motion, whereby the collar 58 is slid along the shaft.

A bell shaped member 59 is secured to the shaft 12$^a$ just above the collar 55, this member being shaped to extend downward substantially over the balls. It is provided with stops 60 and 61 on its inner periphery which are in a position to be engaged by the balls and thus limit their outward movement. The inward movement of the balls is limited by stops 62 and 63 secured to the shaft 12$^a$. The stops 61 and 63 are in the form of insulated electrical contacts and the ball 52 is provided with contacts on its inner and outer side which are arranged to engage contacts 61 and 63 at the limits of the movement of the ball. These contacts control the operation of two electric driving motors 64 and 65 shown as being of the direct current type and energized from a supply circuit 66 which may be the same as the supply circuit 45. The contacts carried by the ball 52 are connected directly to one side of the supply circuit 66 by means of a conductor 67 and engagement with the contact 61 closes a circuit for the armature of the motor 65 while engagement with the contact 63 closes a circuit for the armature of the motor 64. The fields of these motors are preferably constantly excited, as shown, so that the motors will be more quickly responsive.

The motors 64 and 65 are mechanically connected so as to rotate the armature winding 19. They are geared to a shaft 68 and the arrangement is such that the motors drive the shaft in opposite directions, only one motor being in operation at any one time. A reversing clutch 69 is provided whereby the shaft 68 can be connected, by throwing the clutch upward, directly to a shaft 70 from which point the mechanical driving connection is continued through a driving shaft 71 to a shaft 72 to which the armature winding 19 is secured. A spur gear 73 is loosely mounted on the shaft 70 and by throwing the clutch 69 downward this gear is locked to the shaft 70, the shaft 68 being disconnected. With the clutch in this position the shaft 70 is rotated in the opposite direction, the drive then being from the shaft 68 through a counter shaft 74 and suitable reversing gears to the shaft 70.

The rotation to be given the armature winding 19 when the motor 12 is starting should be in a direction opposite to the rotation being applied to the field winding 18 and it is the function of the reversing clutch 69 to select the proper direction of rotation to be applied to the armature winding. The clutch is operated from one position to the other by means of a lever arm 75 which in turn is moved by magnet coils 76 and 77. These magnet coils are energized in dependence on the direction of rotation of the motor 12 by means of an electrically insulated contact arm 78 which is mechanically connected through a slip friction coupling 79 to the shaft 12$^a$. The contact arm 78 moves between two stationary contacts 80 and 81 and it is electrically connected to one side of the supply source 66. Rotation of the motor 12 in one direction causes the contact arm to engage the contact 80 whereby a circuit is closed for the magnet coil 77 to the supply source 66. This energization of the magnet coil 77 causes it to pull its armature downward and thereby throw the clutch 69 upward for one direction of rotation of the armature winding. When the motor 12 rotates in the opposite direction the contact arm engages the contact 81 whereby a circuit is closed for the magnet coil 76 and the clutch 69 thrown thereby to its lowermost position as shown in the drawing, provided of course that it is not already in this position. After the contact arm engages with one or other of the stationary contacts 80 or 81 the frictional driving connection 79 slips to permit continued rotation of the driving motor.

In order to prevent the throwing of the clutch at any other time than at the inception of the movement of the searchlight an interlocking device is provided comprising an arm 82 secured to a lever 75 and a disk member 83 having an upwardly turned flange around its periphery. This disk member is mounted for rotation about a substantially vertical axis adjacent the lower end of the arm 82 so that the flange of the disk member would interfere with the movement of the arm 82 and thereby prevent throwing of the clutch. A driving connection comprising gears 84 is provided between the disk member and the shaft 71 whereby the disk member is driven at the same speed as the armature winding 19. A slot 85 is provided in the flange of the disk member and when the searchlight is not subject to motion in train this slot is in such position that the lower end of the arm can pass through it to permit the throwing of the clutch to the proper position. When the searchlight is not at rest the flange of the disk member 83 interferes with the arm 82 so that the clutch cannot be thrown and therefore accidental movement of the contact arm 78 into engagement with the opposite contact will have no effect upon the control mechanism.

A follow up control is provided whereby the motors 64 and 65 are stopped after a predetermined angular rotation has been given the armature winding for a given speed of rotation of the motor 12. This follow-up control comprises a sleeve 86 through which the shaft 12$^a$ passes and a driving gear train 87 connecting the shaft 68 with a fixed spur gear 88 which has a threaded hub cooperating with threads on the sleeve 86. Therefore, rotation of the shaft 68 causes movement of translation of sleeve 86 in the direction of its axis in one direction or the other depending upon the direction of rotation of the shaft 68. The sleeve 86 is connected through a tension spring 89 to the collar 58, a ring bearing 90 being provided whereby the collar is free to rotate independently of the spring. Guide rods 91 and 92 are provided respectively for preventing rotation of the sleeve 86 and the portion of the collar 58 to which the spring 89 is attached. It will be observed that when a given rotation has been applied to the armature winding 19 upon the occurrence of a predetermined speed of rotation of the shaft 12$^a$, the sleeve 86 will have been moved downward to such an extent that the pull downward on the collar 58, transmitted through the spring 89, will pull the balls inward and open the circuit of the motor 65. Likewise when the motor 12 is coming to rest, in which case reverse rotation will be given to the armature winding 19, the sleeve 86 will be moved upward as the motor 64 operates and thereby cause disengagement of the contact 63 and engagement of 61 so as to control the reverse rotation of the armature winding to correspond with the speed of the motor 12.

In the operation of our system, when the telescope is turned an electromotive force is induced in the winding 18 which causes power to be supplied to the motor 12 from the generator 42 whereby the motor is caused to operate in the proper direction and drive the searchlight in the direction of movement of the telescope. As the motor starts, the contact arm 78 engages either contact 80 or 81 and thereby selects the direction of rotation to be applied to the armature winding 19, and the rotation of the motor 12 causes the speed responsive device 50 to close the circuit of the motor 65 whereby this rotation is applied to the armature winding 19. Preferably the speed responsive device is arranged to close the circuit of the motor 65 immediately upon the starting of the motor so that rotation is applied to the armature winding 19 throughout the period of acceleration of the motor, this rotation being dependent upon the speed by reasons of the follow-up connection previously described between the shaft 68 and the speed responsive device. When the motor has attained its proper running speed corresponding to the speed of the telescope, the armature winding 19 will have been given a rotation corresponding to this speed. The motor 12 likewise rotates the field winding 18 in a direction to tend to reduce its electromotive force, i. e., in a direction to follow the movement given the field of the winding 19 by the telescope, and the rotation applied during acceleration to the winding 19 is in a direction opposite to the rotation being given the field winding 18 at the same time.

The characteristics of the tubes are such that the voltage gradient for the motor is extremely steep. In other words only a very small rotation of the telescope with respect to the searchlight is required to cause full voltage to be applied to the motor 12. The voltage applied to the motor, and consequently the speed of the motor, will obviously depend upon the speed with which the telescope is being rotated. It is contemplated that with the usual speeds of the telescope, a motor 12 will be used having sufficient torque and speed to drive the searchlight as fast as the telescope is being moved. Under normal conditions of operation the motor will not be operated on full voltage although full voltage may be applied to the motor during acceleration. It will be understood that if the telescope is being moved at a uniform speed, the searchlight will follow with the lag introduced by rotation of winding 19 plus the slight angular lag necessary to cause the required operating voltage to be applied to the motor. Due to the steep voltage gradient this latter lag is very small.

Since the centrifugal force of the balls 61 and 62 of the speed responsive device varies as the square of the speed, it follows that the rotation given the armature winding 19 varies as the square of the speed. This rotation of the armature winding 19 has the effect of moving the position of angular correspondence between the telescope and the searchlight for an angular distance varying as the square of the speed, and in a direction to meet the field winding 18. When the motor is accelerating this rotation of the armature winding, which is being introduced at the same time, has the effect of decreasing the angular displacement of the field winding 18 with respect to it so that the voltage impressed on the motor and consequently acceleration of the motor is decreased. It will further be observed that the total angular disagreement between the searchlight and the telescope, i. e., the lag of the searchlight, is equal to this angular distance through which the armature winding 19 is moved plus the slight angular lag necessary to produce the required voltage for the motor. Since ordinarily the movement applied to the armature winding is many times the lag of the field winding required to produce the operating voltage, the assumption may be made without appreciable error that the searchlight lags a distance varying with the square of the speed of the motor, this angular distance being equal to the displacement of the armature winding.

It will thus be observed that when the telescope is being moved at a uniform speed the motor 12 will drive the searchlight with a lag proportional to the square of the speed plus an inappreciable additional lag necessary to produce the required voltage for the motor, this latter lag being the angular lag of the field winding 18 behind the rotating field of the armature winding 19. For convenience in describing the operation, the actual angular position of the field of the armature winding 19 may be termed the "apparent" position of correspondence. In other words, if the field winding should overtake the field of the armature winding 19, a condition of zero voltage impressed on the motor 12 will be produced, which is a condition of correspondence between the searchlight and the telescope, although as a matter of fact the searchlight would still have an angular lag equal to the rotation given the armature winding 19. The true position of correspondence is of course that position of the searchlight in which the armature winding has no angular displacement and zero voltage is impressed on the motor.

Assuming now that the telescope has been brought to rest, the motor 12 will continue its rotation and the field winding 18 will begin to overtake the field of the armature winding 19 which is now temporarily fixed in space. As the motor thus approaches the position of apparent correspondence, its impressed voltage is rapidly decreased, while it will retain to a large extent its counter electromotive force by virtue of its speed. The motor is, therefore, dynamically braked through its supply circuit including the armature of the generator 42, and this braking torque or braking force obviously increases rapidly as the impressed voltage of the generator decreases. During the initial stage of the deceleration the motor may move the field winding 18 to the position of apparent correspondence with the field of the armature winding 19 or even past this position, which will depend to a large extent upon the inertia of the various moving parts. The field winding may even initially oscillate to some extent from side to side of the position of apparent correspondence, but it quickly finds a position of substantial stability with respect to the field of the armature winding 19 in which position a substantially constant and substantially fixed braking force is applied by virtue of the counter torque of the motor, and this braking force is applied during the remainder of the deceleration period.

As the deceleration of the motor proceeds, the speed responsive device 50 functions to turn the armature winding 19 back toward its true position. This has the effect of moving the position of apparent correspondence ahead of the field winding 18. Since the existing angular displacement of the armature winding is always proportional to the square of the motor speed, and consequently the position of apparent correspondence differs by that amount from the position of true correspondence, it follows that the motor is brought to rest from any position of apparent correspondence in travelling a distance proportional to the square of the speed it had upon arriving at that position, and consequently a substantially constant decelerating torque must have been applied to the motor to bring this about.

This can be shown from the following well known equations:

(1) $h = \frac{1}{2} at^2$ (2) $v = at$ in which
$h$ = the distance travelled
$a$ = a constant rate of deceleration
$t$ = the time
$v$ = the velocity lost through the deceleration.

Solving equation 2 for $$t = \frac{v}{a}$$

Substituting in (1) $h = \frac{1}{2}a\frac{v^2}{a^2} = \frac{v^2}{2a}$

Therefore $h$ varies as $v^2$ since $a$ is a constant.

The inertia of the motor and other parts, and various other factors affecting the rate of deceleration, are preferably so selected that the greatest possible overrunning of the motor past the apparent position of correspondence will not be great enough to cause full voltage in the reverse direction to be applied to the motor. This confines the possible oscillations of the field winding during the initial stage of declaration to the small range of angular movement between the maximum voltage positions in the two directions on either side of the position of apparent correspondence. The magnitude of the counter-torque of the motor utilized to produce deceleration is substantially the same for all speeds, i. e., it is substantially fixed, and the speed responsive device operates to apply this decelerating or braking force over an angular distance at the end of the motor travel which varies with the square of the motor speed, so that regardless of its speed, the driven object is always brought to rest in angular agreement, without overrunning, by the application of this fixed braking force. Oscillation of the motor from one side to the other of its final position is thus prevented so that the motor is brought to rest very quickly.

While that operation of the system has been described which is most appropriate to the application disclosed it will be understood that the system may be arranged for somewhat different operation, the same general principles being applied however. For example, in the control of elevators the driving motor 12 may not have sufficient speed and torque to drive the elevator as fast as the controlling object which may in this case be an index hand or control handle in a control room or on the car. Preferably with elevators the control device will be moved quickly from one position to another, the motor following at an appropriate maximum speed giving due consideration for the comfort of the passengers. In such case the motor 12 will operate under full voltage.

It should furthermore be understood that our invention is not limited to the control of the deceleration of the driving motor in accordance with the square of the speed, since it is contemplated that the deceleration of the driving motor may be controlled in accordance with various other functions of the operation of the driven object so as to cause the driven object to be brought to rest in angular correspondence.

In the modified form of our invention shown in Fig. 2 the armature winding 19 is not rotatably mounted. In this form the control of the voltage in the field winding 18 in order to properly decelerate the motor is brought about by rotating the field winding itself by means of the speed responsive device. 50. The shaft 12$^a$ is connected to the field winding 18 through a gear train 95, which corresponds with the gear train 13 of Fig. 1, leading through a differential gear 96 of any well known form, the other element of which is driven from the shaft 71. As shown, two planetary bevelled gears 97 and 98 are provided which are between two bevelled gears 99 and 100. The two planetary gears are connected through shaft 101 to the gear train 95 so as to be driven by the shaft 12$^a$ while the large bevelled gear 99 is connected to the shaft 71. The remaining large bevelled gear 100 is connected to the field winding 18. With this arrangement it will be observed that any rotation of shaft 12$^a$ is applied to the field winding independently of rotation received from the shaft 71 due to the operation of the speed responsive device, and, furthermore, any rotation of shaft 71 is applied to the field winding independently of rotation of shaft 12$^a$. For the purpose of simplifying the drawing the searchlight has been shown connected to the shaft 12$^a$ through an independent gearing 102. With this arrangement the operation is such that the field winding has identically the same voltages induced in it as are induced with the arrangement of Fig. 1. When decelerating the motor turns the field winding past its correct position with respect to the field of the armature winding 19, as before. A counter torque is thus applied to the motor to decelerate it in substantially the same manner as previously described in connection with Fig. 1.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letter Patent of the United States, is:

1. Means for driving an object into positional agreement with a controlling object, comprising a driving motor for said driven object, control means for said motor operated by said objects, and auxiliary means responsive to the speed of said motor for applying a substantially fixed braking force at such point in its travel that said object is brought to rest in a predetermined position without overruning regardless of its speed when said braking force is applied.

2. Means for driving an object in positional agreement with a controlling object, comprising a driving motor for said driven object, control means for said motor, a driving connection between said control means and each of said objects, and auxiliary means responsive to the speed of said driven object for actuating said control means to anticipate the final position of said driven object so as to bring said driven object to rest in a predetermined position without overrunning.

3. Means for driving an object into positional agreement with a controlling object, comprising a driving motor for said driven object, control means for said motor operated by said objects, and means responsive to the square of the speed of said driven object for applying a braking force to said object so as to bring said object to rest in a predetermined position without overrunning.

4. Means for driving an object into positional agreement with a controlling object, comprising a driving motor for said driven object, control means for said motor operated by said objects, and means responsive to the operation of said motor for applying a braking force at a variable point in the travel of said driven object such that it is brought to rest by said braking force in angular agreement with said controlling object without overrunning.

5. Means for driving an object into positional agreement with a controlling object, comprising a driving motor for said driven object, control means for said motor operated by said objects, and means responsive to the speeds and relative positions of said objects for applying a substantially constant braking force to said driven object during a final portion of its travel which is proportional to the square of its speed, whereby said driven object is brought to rest in positional agreement with said controlling object.

6. Means for driving an object into positional agreement with a controlling object, comprising a driving motor for said driven object, control means for said motor actuated by said objects to cause said motor to drive the driven object into positional agreement with the controlling object, and auxiliary means responsive to the movement of said driven object for actuating said control means to anticipate the final position of said driven object so as to bring said driven object to rest in positional agreement with said controlling object without overrunning.

7. Means for driving an object into positional agreement with a controlling object, comprising a driving motor for said driven object, control means for said motor responsive to the movements of said objects so as to cause said motor to drive said driven object into positional correspondence with said controlling object, said control means having a position of correspondence corresponding to the position of correspondence of said objects, and means for temporarily shifting the position of correspondence of said control means so as to bring said driven object to rest without overrunning.

8. Means for driving an object into positional agreement with a controlling object, comprising a driving motor for said driven object, control means for said motor responsive to the movements of said objects to cause said motor to drive said driven object into positional correspondence with said controlling object, said control means having a position of correspondence corresponding to positional correspondence of said objects, and means for temporarily shifting the position of correspondence of said control means by an amount proportional to the speed of said motor so as to bring said driven object to rest without overrunning.

9. Means for driving an object into positional agreement with a controlling object comprising a driving motor for said driven object, control means for said motor responsive to the movements of said objects to cause said motor to drive said driven object into positional correspondence with said controlling object, and auxiliary means responsive to the operation of said motor for operating said control means in accordance with a fictitious angular displacement of said objects.

10. Means for driving an object into positional agreement with a controlling object, comprising a driving motor for said driven object, control means for said motor actuated by said objects to cause said motor to drive said driven object into positional agreement with said controlling object, and auxiliary means responsive to the speed of said motor for actuating said control means to control the deceleration of said motor.

11. Means for driving an object into positional agreement with a controlling object, comprising a driving motor for said driven object, control means for said motor actuated by said objects to cause said motor to drive said driven object into positional agreement with said controlling object, and means responsive to the speed of said motor for actuating said control means to control the deceleration of said motor so as to cause said driven object to be moved into positional agreement with said controlling object without overrunning.

12. Means for driving an object into positional agreement with a controlling object, comprising a driving motor for said driven object, control means for said motor actuated by said objects to cause said motor to drive said driven object into positional agreement with said controlling object, and means responsive to the square of the speed of said motor for applying a counter torque to said motor so as to bring said driven object to rest in positional agreement with said controlling object without overruning.

13. Means for driving an object into positional agreement with a controlling object comprising means driven by said controlling object for producing an alternating magnetic field rotating in accordance with the movement of said controlling object, a motor for driving said driven object, means responsive to the angular position of said field for controlling said motor to cause said motor to drive said driven object into positional correspondence with said controlling object, and auxiliary means for displacing said field independently of said controlling object.

14. Means for driving an object into positional agreement with a controlling object comprising a driving motor for said driven object, control means for said motor responsive to the movements of said objects so as to cause the motor to drive said driven object into positional correspondence with said controlling object, said control means having a position of correspondence corresponding to the position of correspondence of said objects, and means responsive to the operation of said motor for temporarily displacing the position of correspondence of said control means to regulate the deceleration of said motor so as to bring said driven object to rest in positional agreement with said controlling object without overrunning.

15. Means for driving a remote object into angular agreement with a controlling object comprising a driving motor for said driven object, control means for said motor actuated jointly by said objects in accordance with their angular displacement whereby said motor is caused to drive the driven object into angular agreement with the controlling object, and auxiliary means responsive to the operation of said motor for temporarily operating said control means in accordance with a fictitious increased angular displacement of said objects so as to control the deceleration of said motor to bring said driven object to rest in angular agreement with said controlling object without substantial overrunning.

16. Means for driving an object into positional agreement with a controlling object comprising means driven by said controlling object for producing an alternating magnetic field rotating in accordance with the movement of said controlling object, a motor for driving said driven object, means responsive to the angular position of said field for controlling said motor to cause said motor to drive the driven object into positional correspondence with said controlling object, and means responsive to the operation of said motor for rotating said field independently of said controlling object.

17. Means for driving an object into positional agreement with a controlling object comprising means driven by said controlling object for producing an alternating magnetic field rotating in accordance with the movement of said controlling object, a motor for driving said driven object, means responsive to the angular position of said field for controlling said motor to cause said motor to drive the driven object into positional correspondence with said controlling object, and means responsive to the speed of said motor for rotating said field independently of said controlling object so as to cause a temporary displacement thereof such that deceleration of said motor is started in time to bring said driven object to rest without overrunning.

18. Means for driving an object into positional agreement with a controlling object, comprising means driven by said controlling object for producing an alternating magnetic field rotating in accordance with the movement of said controlling object, a motor for driving said driven object, means responsive to the angular position of said field for controlling said motor to cause said motor to drive said driven object into positional correspondence with said controlling object, and means responsive to the speed of said motor for rotating said field in a direction opposite to its rotation by said controlling object.

19. Means for driving an object into positional agreement with a remote controlling object, comprising means driven by said controlling object for producing an alternating magnetic field rotating in accordance with the movement of said controlling object, a motor for driving said driven object, means responsive to the angular position of said field for controlling said motor to cause said motor to drive said driven object into positional agreement with said controlling object, and means responsive to the square of the speed of said motor for turning said field independently of said controlling object first in a direction opposite to its rotation by said controlling object and thereafter back to a predetermined position with said controlling object as the driven object moves into positional agreement with said controlling object, whereby said driven object is brought to rest without overrunning.

20. Means for reproducing position comprising in combination with a controlling object and a driven object, a driving motor for said driven object, means for producing an electromotive force upon positional disagreement of said objects corresponding in value and direction to the amount and direction of said positional disagreement, means responsive to said electromotive force for controlling said motor whereby said motor is caused to drive said driven object into positional agreement with said controlling object, and auxiliary means driven by said motor for varying said electromotive force so as to retard the acceleration of said motor.

21. Means for reproducing position comprising in combination with a controlling object and a driven object, a driving motor for said driven object, means for producing an electromotive force upon positional disagreement of said objects corresponding in value and direction to the amount and direction of said positional disagreement, means responsive to said electromotive force for controlling said motor whereby said motor is caused to drive said driven object into positional agreement with said controlling object, and means responsive to the speed of said motor for varying said electromotive force so as to temporarily reduce the speed of said motor.

22. Means for reproducing position comprising in combination with a controlling object and a driven object, driving means for said driven object, means for producing an alternating electromotive force upon angular disagreement of said objects having a direction determined by the direction of such angular disagreement, power amplifying means responsive to said electromotive force arranged to selectively apply its amplified output to control said motor in accordance with the direction of said electromotive force, whereby said motor is caused to drive said driven object into positional agreement with said controlling object, and means responsive to the speed of said motor for varying the value of said electromotive force so as to cause a counter torque to be applied to said motor at such distance from the position of correspondence of said objects that said driven object is brought to rest without overrunning.

23. Means for reproducing position comprising in combination with a controlling object and a driven object, means for producing an alternating magnetic field rotating in accordance with the rotation of said controlling object, a coil in said field rotating with said driven object, a motor for driving said driven object, means responsive to the electromotive force induced in said coil for controlling said motor, and means responsive to the speed of said motor for rotating said field independently of said controlling object.

24. Means for reproducing position comprising in combination with a controlling object and a driven object, means for producing an alternating magnetic field rotating in accordance with the rotation of said controlling object, a coil in said field rotating with said driven object, a motor for driving said driven object and said coil, means responsive to the electromotive force induced in said coil for controlling said motor, and means responsive to the speed of said motor for rotating said field independently of said controlling object in a direction opposite to its rotation by said controlling object, said means operating to rotate said field back to a predetermined angular relation with said controlling object as said driven object moves into positional agreement with said controlling object.

25. Means for reproducing position comprising in combination with a controlling object and a driven object, a field winding rotated by said controlling object in a predetermined angular relation therewith, a source of alternating current supply connected to said field winding, a polycircuit armature winding associated with said field winding, a second rotatably mounted polycircuit armature winding electrically connected to said first armature winding so as to produce an alternating magnetic field moving with said controlling object, a motor for driving said driven object, a rotatably mounted magnet coil in said field driven by said motor, means responsive to the electromotive force induced in said coil for controlling said motor so as to cause the motor to drive the driven object into positional agreement with the controlling object, and means responsive to the square of the speed of said motor for turning said field independently of said controlling object so as to bring said driven object to rest without overrunning.

26. Means for driving an object into angular agreement with a controlling object comprising a driving motor for said driven object, a source of electrical supply for said motor, regulating means for said supply source, an operating connection between said regulating means and each of said objects whereby said motor is caused to drive said driven object into angular correspondence with said controlling object, and auxiliary means responsive to the operation of said motor for operating said regulating means to anticipate the final position of said driven object so as to bring the driven object to rest in angular agreement with said controlling object without overrunning.

In witness whereof, we have hereunto set our hands this 28th day of November, 1925.

EDWARD M. HEWLETT.
WALDO W. WILLARD.